May 1, 1962 A. C. JONES 3,032,721

TRANSISTOR OSCILLATORS HAVING OVERLOAD PROTECTIVE MEANS

Filed Dec. 3, 1959

INVENTOR
Alfred Conway Jones
BY
Baldwin & Wight
ATTORNEYS

United States Patent Office 3,032,721

Patented May 1, 1962

3,032,721

TRANSISTOR OSCILLATORS HAVING OVERLOAD PROTECTIVE MEANS

Alfred Conway Jones, Chelmsford, England, assignor to Marconi's Wireless Telegraph Company Limited, London, England, a British company Filed Dec. 3, 1959, Ser. No. 857,068
Claims priority, application Great Britain Dec. 23, 1958
6 Claims. (Cl. 331—62)

This invention relates to transistor oscillators. Although not limited to its application thereto the invention is particularly well suited to transistor oscillators suitable for use in apparatus for producing high tension voltage from a low voltage D.C. source. Of recent years the familiar type of vibrator unit for producing high tension voltage from a low voltage source has increasingly given way to apparatus in which high tension is produced by rectifying the oscillatory output from a transistor oscillator driven by a low voltage D.C. source. Such apparatus has obvious advantages over the older vibrator type of apparatus, one important practical advantage being that there are no moving parts or contacts to maintain.

Figure 1:
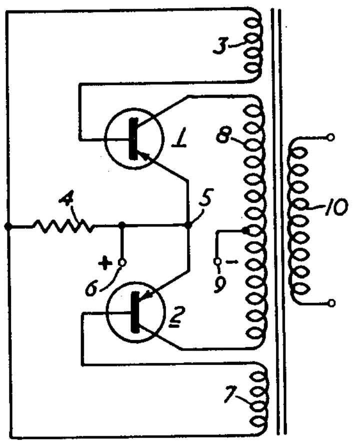
Figure 2:
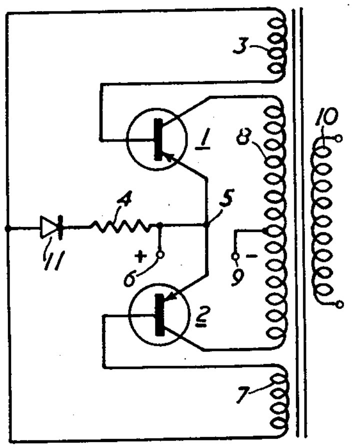
Figure 3:
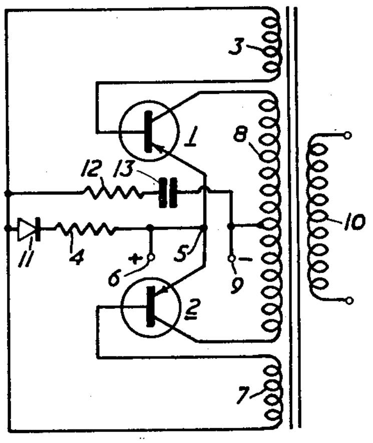
Figure 4:
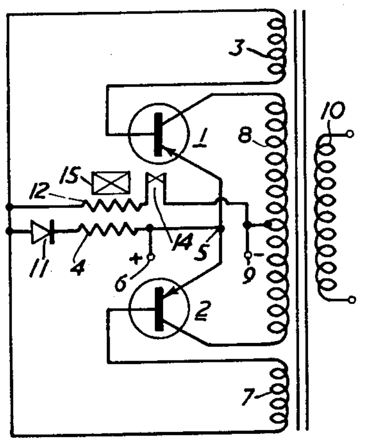

The invention is illustrated in and explained in connection with the accompanying drawings in which FIG. 1 is a diagram of a typical known transistor oscillator and is provided in order to facilitate explanation of a defect which exists with such oscillators and which it is the object of the present invention to eliminate; and FIGS. 2, 3 and 4 are diagrams of three embodiments of this invention.

Referring to FIG. 1, the oscillator therein shown includes two transistors generally designated 1 and 2 and which are assumed to be of the p-n-p type. The base of the transistor 1 is connected through a back-coupling coil 3 and a resistance 4 in series to the positive terminal 6 of a source of operating potential (not shown) to which terminal the common emitter connection 5 is also connected. The base of the transistor 2 is similarly connected through a back-coupling coil 7 and the aforesaid resistance 4 to the points 5 and 6 which are, of course, electrically the same point. The coils 3 and 7 are coupled to a divided output coil 8 which is connected between the collectors and has a centre tap connected to the negative terminal 9 of the source of operating potential. The coil 8 is the primary of a push-pull output transformer whose secondary is shown at 10.

With an arrangement as shown in FIGURE 1, as the load (not shown) applied across the secondary coil 10 increases from the open circuit condition, the overall efficiency of the oscillator increases up to a maximum value which is maintained over a comparatively small range of loads and then decreases rapidly. A typical maximum efficiency value obtained in practice is about 85%. If the load is increased enough, a point is reached where the oscillator will cease to oscillate, but there is a fairly wide range of loading between that corresponding to maximum efficiency and that at which oscillation ceases over which it is possible to damage the transistors by overheating. The object of the present invention is to protect against such damage.

The above mentioned decrease of efficiency occurring with increase of load beyond that corresponding to maximum efficiency is due to the transistors failing to "bottom" to their normal low collector voltage. Such failure results in an increase in collector dissipation in the "bottomed" state and overheating may result to an extent sufficient to damage the transistors.

Referring again to FIGURE 1, suppose the oscillator therein shown is oscillating. Then the resistance 4 will pass the base current of each transistor in turn and since the base current waveform of each transistor approximates roughly to a rectangular wave, the current through resistance 4 will be D.C. with a small superimposed A.C. component. During oscillation the voltage developed at the junction point of the coils 3 and 7 with the resistance 4 is substantially constant and a few volts positive with respect to the voltage at the common emitter connection 5. Under conditions of overloading the voltage drop at the collectors due to poor "bottoming" reduces the voltage available across the halves of the winding 8 and therefore across the windings 3 and 7, and accordingly the voltage at the junction point of coils 3 and 7 with resistance 4 falls. This effect is utilised in the present invention to provide protection.

According to the invention a back-coupled transistor oscillator includes, in series in a circuit connecting the base of the transistor to one terminal of an operating potential source, a unilaterally conductive device so poled as to be conductive for current flowing in the direction of said terminal.

According to a feature of this invention a back-coupled transistor oscillator includes a back-coupling coil connected in a series circuit with a unilaterally conductive device between the base of the transistor and one terminal of an operating potential source, said device being so poled as to be conductive for current flowing in the direction of said terminal, an output coil to which said back-coupling coil is coupled, said output coil being connected between the collector and the remaining terminal of said source, and a connection between said one terminal and the emitter. Of course, if the transistor is of the p-n-p type, said one terminal will be the positive terminal of the source. However, n-p-n transistors can equally well be used, and in this case, of course, the source polarity will be reversed. Preferably a resistance element is also included in the said series circuit, but this is not essential since the effect of such a resistance element can be obtained by choosing the said unilaterally conductive device to be of such characteristics and so choosing the number of turns in the back-coupling coil that the forward resistance of said device provides a suitable value of resistance in said series circuit.

In a preferred embodiment there are two transistors with their emitters connected to one terminal of the operating source; a centre-tapped output coil connected between the collectors and with its centre-tapping connected to the other terminal of said source; two back-coupling coils coupled to said output coil; a series circuit including one of said back-coupling coils, a unilaterally conductive device and a resistance between the base of one transistor and said one terminal; and a series circuit including the other of said back-coupling coils, said device and said resistance between the base of the other transistor and said one terminal, said device being so poled as to be conductive for current flowing in the direction of said one terminal. The output coil may be the divided primary of a push-pull transformer.

In order to render the oscillator self-starting a circuit including a high resistance in series with a condenser may be connected between said other terminal of the operating source and the side of the unilaterally conductive device remote from said one terminal of the operating source. In place of the condenser there may be inserted the normally closed contacts of a relay connected to be actuated automatically to open said contacts after the commencement of oscillation. If desired the relay may be arranged to be actuated by the generated oscillations, e.g. it may be constituted by a so-called thermal switch traversed by said oscillations. If this is done the relay should be so arranged that, when actuated, it stays in actuated condition until reset (e.g. by a push-button) otherwise it may "hunt," i.e. go on closing and opening.

FIGURE 2 shows a simple embodiment of this invention. Like references denote like parts throughout the figures, and it will be seen that the difference between FIGURES 1 and 2 lies in the insertion in the latter figure of a rectifier 11 between the junction point of the coils 3 and 7 and the adjacent end of the resistance 4. This rectifier is so poled, i.e. connected in such sense, as to be conductive when the said junction point is positive with respect to the point 5. It will be seen, therefore, that if the voltage at the said junction point falls, the voltage across the rectifier 11 also falls and accordingly its resistance increases. This increase of resistance reduces the base current drawn by each transistor which causes further reduction of the voltage across the halves of the coil 8 so that a cumulative action sets in resulting in rapid switching off of the oscillations. The circuit of FIGURE 2 is thus self-protecting.

In order to make a known circuit as shown in FIGURE 1 self-starting, it is common to provide an additional resistance (not shown) between the junction point of the coils 3 and 7 and the negative terminal 9 of the supply source. This applies a negative voltage to the transistor bases long enough to allow the oscillations to build up. This same self-starting expedient may be applied to oscillators embodying the present invention provided that the added circuit for self-starting does not insert a permanent direct current path from the aforesaid junction point to the negative supply terminal.

FIGURES 3 and 4 show two embodiments of the present invention with an added self-starting circuit that does not prevent operation of the invention to protect the transistors. In FIGURE 3 the added self-starting circuit comprises the relatively high resistance 12 (it may, in practice, be from say 40 times to, say, 100 times as high as resistance 4) in series with normally closed contacts 14 which are arranged to be opened except during starting. The contacts 14 are the contacts of a relay whose operating member is conventionally represented by the block 15. The relay may be operated in any convenient way, e.g. by oscillations generated by the oscillator. Thus the relay may be a so-called thermal switch arranged to be opened by oscillations produced by the oscillator and flowing through its heater.

I claim:

1. A back-coupled transistor oscillator including a back-coupling coil connected in a series circuit with a unilaterally conductive device between the base of the transistor and one terminal of an operating potential source, said device being so poled as to be conductive for current flowing in the direction of said terminal, an output coil to which said back-coupling coil is coupled, said output coil being connected between the collector and the remaining terminal of said source, a connection between said one terminal and the emitter, and a high resistance in series with switch means connected between said other terminal of the operating source and the side of the unilaterally conductive device remote from said one terminal of the operating source.

2. An oscillator as claimed in claim 1 and comprising two transistors with their emitters connected to one terminal of the operating source; a centre-tapped output coil connected between the collectors and with its centre-tapping connected to the other terminal of said source; two back-coupling coils coupled to said output coil; a series circuit including one of said back-coupling coils, a unilaterally conductive device and a resistance between the base of one transistor and said one terminal; and a series circuit including the other of said back-coupling coils, said device and said resistance between the base of the other transistor and said one terminal, said device being so poled as to be conductive for current flowing in the direction of said one terminal.

3. An oscillator as set forth in claim 1 wherein said switch means comprises the normally closed contacts of a relay between said other terminal of the operating source and the side of the unilaterally conductive device remote from said one terminal of the operating source, said relay being arranged to be actuated automatically to open said contacts after the commencement of oscillation.

4. An oscillator as set forth in claim 1 wherein the relay is arranged to be actuated by the generated oscillations, and being such that when actuated, it stays in actuated condition until reset.

5. An oscillator as set forth in claim 1 wherein the relay is constituted by a thermal switch traversed by the generated oscillations.

6. An oscillator as set forth in claim 1 wherein said switch means includes a condenser.

References Cited in the file of this patent

UNITED STATES PATENTS

| | | |
|---|---|---|
| 2,931,991 | Schultz | Apr. 5, 1960 |